March 19, 1929.   H. A. KNOX ET AL   1,705,980
TRACKLAYING VEHICLE
Filed May 1, 1925
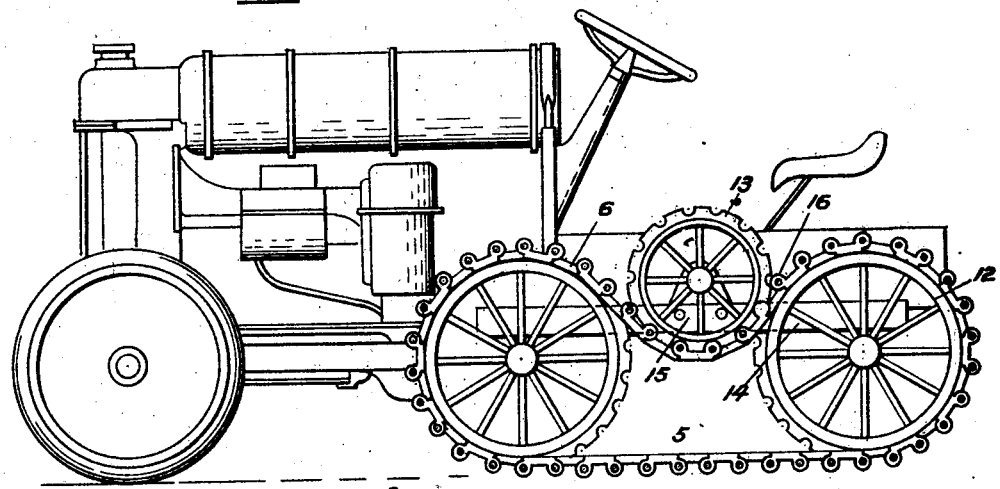
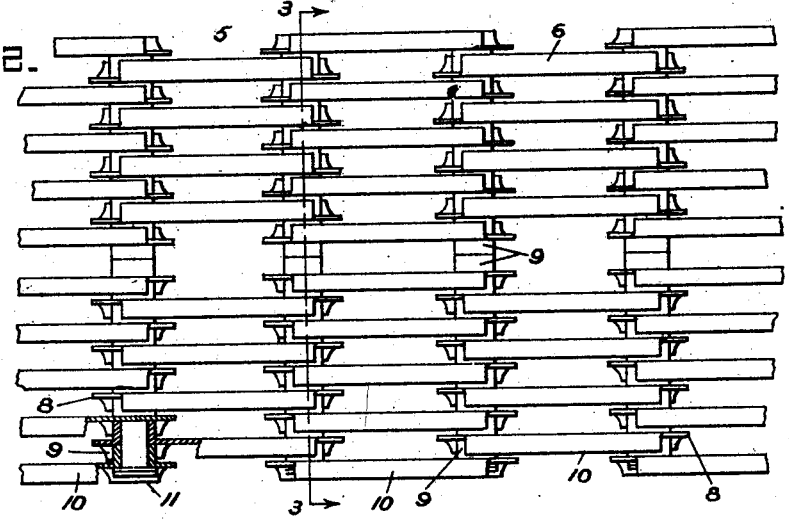
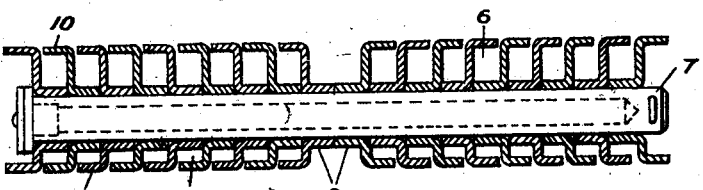
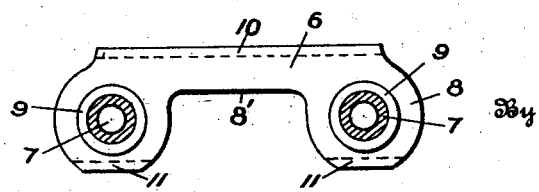
Inventor
Harry A. Knox
Bertie F. Baker
By W. N. Roach
Attorney Patented Mar. 19, 1929.

1,705,980

UNITED STATES PATENT OFFICE.

HARRY A. KNOX AND BERTIE F. BAKER, OF DAVENPORT, IOWA.

TRACKLAYING VEHICLE.

Application filed May 1, 1925. Serial No. 27,277.

(GRANTED UNDER THE ACT OF MARCH 3, 1883, AS AMENDED APRIL 30, 1928; 370 O. G. 757.)

The invention described herein, if patented, may be manufactured and used by or for the Government for governmental purposes without the payment to me of any royalty thereon.

This invention relates in general terms to a track laying vehicle, and more particularly it has reference to a track and a method of driving the same.

In vehicles of the track laying type, the track consists generally of an endless belt formed of closed and more or less rigid shoes linked together and provided on their inner sides with rails for the supporting rollers of the vehicle. The track is stretched over a pair of wheels, one, or both of which may be a drive sprocket which engages driving lugs on the track.

Instead of driving the track through one of the track carrying wheels, it is proposed in the present invention to provide a track capable of taking an overhead drive. In attaining this end the track sections are so devised that the outer tread of the track constitutes transverse cleats for aiding in ground traction and which upon reaching the upper run of the track are reversely bent to expel dirt and form driving means for engaging the drive sprocket.

This method of effecting the drive renders the present track particularly applicable for use with adaptors in that the drive sprockets for the tracks may be substituted for the rear wheels of a wheeled tractor and will result in the track laying units being properly positioned with respect to the rear axle.

A further object of the invention is to embody in a track of the described type an improved open-work tread obtained by forming each section of a plurality of laterally spaced link members specially designed to afford a wide tread while reducing friction between adjoining links.

To these and other ends, our invention consists in the construction, arrangement, and combination of elements, described hereinafter and pointed out in the claims forming a part of this specification.

A practical embodiment of our invention is illustrated in the accompanying drawing, wherein:

Fig. 1 is a fragmentary view in side elevation of a vehicle equipped with a track constructed in accordance with the invention, and showing the method of driving the same;

Fig. 2 is a detail plan view of a portion of the track;

Fig. 3 is a sectional view on the line 3—3 of Fig. 2; and

Fig. 4 is a side view of one of the links of a track section.

Referring to the drawing by numerals of reference:

The track 5 is in the nature of a chain belt and comprises articulated sections, each made up of a relatively larger number of pressed steel link members 6 which are mounted alternately with the links of adjoining sections on transverse pivot pins 7.

The links are formed with outwardly projecting enlarged ends 8 for the purpose of taking the pivot pins and to secure greater strength at the joint and also to establish transverse cleats to serve the dual purpose of aiding in traction and forming the driving lugs for engaging the drive sprocket. To this end the ends 8 constituting the driving lugs and the interspaces 8' are dimensioned according to the correspondingly engageable portions of the drive sprocket.

The enlarged ends 8 are formed with offset hubs 9 by which they are mounted on the pivot pins 7 and mutually spaced the proper distance. Both the inner tread 10 and the outer tread 11 of the track are formed by bending the marginal portions of each link member at right angles to the body of the link and reversely to the offset hubs 9. The width of the treads of the individual links is such that sufficient clearance is maintained between the adjoining links at the joint to avoid interference. The expulsion of dirt and the like between the interstices of both the adjoining links and the adjacent links of each section is effected as the track breaks joint in traveling over the rear track carrying wheel 12 and then reversing when engaging the drive sprocket 13. The rims of the wheels 12 may be provided with large apertures (not shown) through which the dirt may fall clear.

The frame 14 for the track carrying wheels may suggestably be suspended from the chassis by a pair of brackets 15. The outer bracket being journaled in the hub cap of the drive sprocket and the inner bracket mounted in the axle housing. The drive sprockets 13 may be directly attached to the drive shafts replacing the rear wheels of a wheeled tractor when converting it into a track laying vehicle. In the present instance the sprocket 13 is positioned between the wheels 12 and above their center line so that the transverse cleats of the outer tread of the track may be presented to the drive sprocket and act as driving lugs in the manner illustrated.

To insure positive drive of the track, one of the wheels is preferably so spaced from the drive sprocket that the entering section of the track, as shown at 16, will be firmly engaged.

While in the foregoing there has been illustrated and described such combination and arrangement of elements as constitute the preferred embodiment of the invention, it is nevertheless desired to emphasize the fact that interpretation of the invention should only be conclusive when made in the light of the subjoined claims.

We claim:

1. A sectional track for track laying vehicles embodying pivot pins, a plurality of alternately placed links connecting each pair of pins and having offset hubs by which they are mounted, the ends of the links projecting outwardly and forming interspaces whereby the outer tread of the track is adapted to constitute driving means for engaging a drive sprocket, and each link having marginal portions bent reversely to the offset hubs to form the treads.

2. A sectional track for track laying vehicles embodying pivot pins, a plurality of links connecting each pair of pins, the links of adjoining sections being alternately mounted on the pins, and the ends of the links projecting outwardly and forming interspaces whereby the outer tread of the track is adapted to constitute driving means for engaging a drive sprocket.

3. A sectional track for track laying vehicles embodying pivot pins, a plurality of links connecting each pair of pins, the links of adjoining sections being alternately mounted on the pins, said links formed with outwardly projecting extremities having offset hubs for mounting on the pins, and each link having marginal portions bent reversely to the offset hubs to form the treads.

4. A sectional track for track laying vehicles embodying pivot pins, a plurality of links connecting each pair of pins, the links of adjoining sections being alternately mounted on the pins, and said links formed with outwardly projecting extremities having offset hubs for mounting on the pins.

5. A sectional track for track laying vehicles embodying pivot pins, a plurality of spaced links connecting each pair of pins and forming both the inner and outer tread and the outer tread of each link formed with enlargements and interspaces adapted to constitute driving means for engaging a drive sprocket.

HARRY A. KNOX.
BERTIE F. BAKER.